United States Patent [19]

Hodge

[11] Patent Number: 4,642,331

[45] Date of Patent: Feb. 10, 1987

[54] METHOD OF ENHANCING THE FLEXIBILITY OF POLYPYRROLE STRUCTURES

[75] Inventor: Ian M. Hodge, Penfield, N.Y.

[73] Assignee: The B. F. Goodrich Company, New York, N.Y.

[21] Appl. No.: 736,057

[22] Filed: May 20, 1985

[51] Int. Cl.[4] ............................ C08F 8/32; C08J 7/12
[52] U.S. Cl. .................................. 528/492; 528/491;
524/251; 524/254; 524/548; 525/326.7;
525/379; 525/382; 204/59 R
[58] Field of Search ............... 528/492, 491; 524/186,
524/254, 548, 251; 427/86; 525/326.7, 379, 382;
204/59 R, 72, 78

[56] References Cited

U.S. PATENT DOCUMENTS

| | | | |
|---|---|---|---|
| 2,463,478 | 3/1949 | Cabal et al. | 548/501 |
| 2,883,362 | 4/1959 | Rosenwald et al. | 524/254 |
| 3,083,181 | 3/1963 | Harris | 260/45.8 |
| 3,247,172 | 4/1966 | Faber | 260/82.1 |
| 3,546,190 | 12/1970 | Vries | 260/88.3 |
| 3,773,717 | 11/1973 | Shoffner | 260/45.9 R |
| 3,912,682 | 10/1975 | Tucker | 260/29.7 |
| 3,923,950 | 12/1975 | Gump et al. | 264/182 |
| 4,125,515 | 11/1978 | Kuczkowski | 260/45.8 |
| 4,170,589 | 10/1979 | Goeke et al. | 526/154 X |
| 4,354,007 | 10/1982 | Scott | 525/379 X |
| 4,464,500 | 8/1984 | Diamond | 524/258 |
| 4,468,291 | 8/1984 | Naarmann et al. | 204/13 |
| 4,543,402 | 9/1985 | Traynor | 526/258 |

FOREIGN PATENT DOCUMENTS 0619489 8/1978 U.S.S.R. ............................... 525/382

OTHER PUBLICATIONS

Shelton, "Stabilization Against Thermal Oxidation" in Polymer Stabilization, W. L. Hawkins (ed.) J. Wiley and Sons (1972) pp. 60–62.

Encyclopedia of Polymer Science and Technology, vol. 2, pp. 185–186 (1965).

Dias, et al. "Electrochemical Polymerization of Pyrrole", J.C.S. Chem. Comm. pp. 635–636 (1979).

Primary Examiner—Joseph L. Schofer
Assistant Examiner—F. M. Teskin
Attorney, Agent, or Firm—Woodrow W. Ban

[57] ABSTRACT

A method for making polypyrrole structures less brittle comprising the steps of contacting the polypyrrole with an antioxidant until a desired degree of non brittleness is achieved. The antioxidants are preferably aromatic antioxidants. Polypyrroles of reduced brittleness include the antioxidants in low percentage.

4 Claims, No Drawings

METHOD OF ENHANCING THE FLEXIBILITY OF POLYPYRROLE STRUCTURES

FIELD OF THE INVENTION

This invention relates to polymerization products of pyrroles and to structures formed therefrom. Particularly, this invention relates to a method and composition for imparting flexibility to polypyrroles and specifically to structures formed from polypyrroles.

BACKGROUND OF THE INVENTION

Pyrroles are known chemical compounds having a five-member ring structure wherein four of the ring members are carbon atoms and the fifth is a nitrogen atom. It is known that the carbon atoms may include substituents such as alkyl, alkene or halogen. The pyrroles may be di-substituted.

Polymerization of pyrrole is also known, and particularly electrochemical polymerization of pyrroles has been disclosed for instance in the J. Chem. Soc. Chem. Comm., pp 635 (1979). Polymerization of pyrrole at the anode of an electrochemical cell in the presence of a conductive salt gives films having electrical conductivity. Such resulting conductive polypyrroles include counter-ions, particularly $BF_4^-$, $AsF_6^-$, $ClO_4^-$, and $HSO_4^-$.

Typically, production of polypyrrole film-like structures is conducted by electrochemical polymerization in a conventional electrolysis cell that may optionally include a diaphragm, employing noble metal electrodes. Platinum or valve metal electrodes such as titanium are typically preferred. The resulting polypyrrole film formed by anodic oxidation is deposited on the anode and subsequently removed by stripping. Methods for continuously forming a film like structure and continuously stripping the structure from an anode have been suggested, for example, in U.S. Pat. No. 4,468,291.

It has been noted, however, that electrolytically formed polypyrrole films, particularly those including the $HSO_4^-$ counter-ion, tend to relative brittleness when formed, and to an increase in brittle character with the passage of time.

Since polypyrroles have desirable resistance to chemical attack and can therefore provide or impart chemical resistance properties to objects forming or contained within a structure enclosed by polypyrrole. But where through embrittlement, the structural polypyrrole cracks or becomes otherwise discontinuous, the capability for the polypyrrole structure in providing protection from chemical attack may be substantially reduced. Where electrically conductive polypyrroles are employed to provide a coating over a substrate thereby enhancing electrical conductivity over the substrate, cracks and other defects in surface characteristics of such a polypyrrole coating could substantially interfere with effective and desirably uniform electrical conductance characteristics. Particularly where polypyrroles are structurally employed in the form of a film subject to frequent movements of even miniscule magnitude, flexibility and a relatively non-brittle characteristic can be important to adequate performance of such films.

A method for enhancing the flexibility of structures, particularly films, comprised of polypyrroles could find substantial utility in the application of polypyrroles to products in industry.

DISCLOSURE OF THE INVENTION

The present invention provides a method for enhancing the flexibility of polypyrrole structures such as films, and a composition of matter providing a structure having a substantially enhanced flexibility wherein polypyrroles are the primary constituent.

Pursuant to the method of the instant invention, a structure such as a film of a polypyrrole is formed and the structure is contacted with an antioxidant. Contact is then discontinued with the antioxidant. Preferably the antioxidant is contained within a solution, the solution being contacted with the polypyrrole structure. The antioxidant is preferably an aromatic antioxidant. In preferred embodiments of the invention, the antioxidant is contacted with the structure for a period at least sufficient to render the film less brittle.

Compositions of matter made in accordance with the instant invention include principally polypyrrole, together with the antioxidant. Where solvent has been used in the process of contacting the antioxidant with the polypyrrole, solvent may be present in the composition. This solvent is desirably subsequently removed. In such compositions, the antioxidant preferably does not comprise more than about 5% by weight of the composition and preferably not more than about 2.5% by weight of the composition.

In preferred embodiments of the invention, the composition resulting from the application of the method of the instant invention includes a polypyrrole formed by electrolytic techniques and including a counter-ion. Typically the counter-ion is one of $HSO_4^-$, $AsF_6^-$, $ClO_4^-$ and $BF_4^-$. Polypyrrole compositions resulting from application of the method of the instant invention enjoy enhanced flexibility and reduced brittleness.

The above and other features and advantages of the instant invention will become more apparent when considered in conjunction with a description of a preferred embodiment of the invention that follows comprising a part of the specification.

BEST EMBODIMENT OF THE INVENTION

The present invention provides a method for reducing the brittleness of polypyrrole structures such as films, and particularly the method of the invention has application to polypyrrole films formed by electrolytic polymerization of pyrroles. In the method, the polypyrrole structure is formed and then contacted with an antioxidant for a desirable period of time after which contact is desisted.

For purposes of the present invention, pyrroles include unsubstituted pyrrole as well as a substituted pyrrole such as N-alkylpyrroles, N-arylpyrroles, pyrroles which are monoalkyl substituted or dialkyl substituted at the carbon atoms and pyrroles which are monohalogenated or di-halogenated at the carbon atoms. The pyrroles can be employed alone or mixed one with another. Unsubstituted pyrrole is much preferred in the production of polymer films but substituted pyrroles can be employed in the process of the invention with preferred pyrroles being the 3,4-dialkylpyrroles, and particularly those where the alkyl is of one to four carbon atoms, as well as the 3,4-dihalopyrroles, with 3,4-dichloropyrrole being preferred. To produce structures such as polymer films, the pyrroles are anodically oxidized and thereby polymerized. Polymerization typically is conducted in an electrolytic cell having an electrolyte-solvent and a suitably conductive salt contained therein. Pyrrole concentrations within the electrolytic cell typically average about 0.1 mol. per liter of the electrolyte-solvent, but substantial deviations are contemplated as within the purview of the invention and do not affect materially the practice of the instant invention. Suitable electrolytic cells for practicing the instant invention are known in the art of making polypyrroles and any suitable or conventional such electrolytic cell may be employed in the practice of the instant invention.

Suitable electrolyte-solvents for electrolytic polymerization of pyrroles should be capable of dissolving the pyrroles and any included conductive salt. Electrolyte-solvents and techniques for enhancing conductivity within such electrolytic cells are known.

Similarly, the conductive salt can be of any suitable or conventional type used in electrolytic polymerization of pyrroles. Such salts typically are ionic or ionizable compounds conventionally used for electrochemical polymerization of pyrroles and particularly, those compounds possessing anions of strong oxidizing acids or of aromatics which have acidic groups whether unsubstituted alkyl and/or nitro or substituted are preferred. Such salts typically contain sodium, potassium, lithium, cations, or cations containing nitrogen or phosphorus. Ions such as $BF_4^-$, $AsF_4^-$, $AsF_6^-$, $SbF_6^-$, $SbCl_6^-$, $PF_6^-$, $ClO_4^-$, $HSO_4^-$, and $SO_4^{-2}$ have proven particularly advantageous anions when resulting from disassociation of conductive salts employed in practicing the instant invention. Such anions, or so-called counter-ions, typically are incorporated into the structure of the polypyrrole being electrolytically formed. Salts including the counter-ions typically comprise from 0.001 to 0.1 mols. per liter of the electrolyte-solvent.

Electrolytic cells for the electrolytic formation of polypyrroles typically include an anode, a cathode, optionally a diaphragm, and a source of d.c. current. Electrolytic reactions employing such cells generally are well known, and appropriate current densities for electrolysis can be readily determined by trial and error. Typically the polypyrrole is electrically formed on the anode which may be comprised of such metals as platinum, valve metals such as titanium and the like.

In addition to electrolytic means for forming polypyrrole structures such as films, catalytic methods are well known in the art and may be employed in producing such structures upon which the instant invention may be practiced. Additionally, in the making of polypyrroles whether by catalytic or electrolytic techniques it is often desirable to include a co-monomer. Alkynes, such as acetylene, and polynuclear aromatics such as oligophenylenes, acenaphthene, phenanthrene, and tetracene, particularly, are other five membered and/or six membered heterocyclic aromatic compounds suitable for use as co-monomers. It is desirable that any such co-monomers include at least one hetero-atom in the ring system. Furans, thiophenes, thiazoles, oxazoles, thiadiazoles, imidazole, pyridiene, substituted pyridienes, pyrazine, and substituted pyrazines are suitable co-monomers. Typically where co-monomers are used, the co-monomers constitute between 20% and 90% by weight of the formed polypyrrole.

In the method of the instant invention, the formed polypyrrole structure is contacted with an antioxidant. By antioxidant what is meant is an inhibitor effective in preventing oxidation by molecular oxygen. While it is believed that any suitable or conventional antioxidant can function in implementing the method of the instant invention, so-called amine antioxidants are preferred in the practice of the invention. The amine antioxidants include primary polyamines such as formaldehyde aniline, diarylamines such as N-phenyl-α-naphthylamine, N-phenyl-β-naphthylamine, p-isopropoxydiphenylamine; bis-diarylamines, such as N,N'-diphenyl-p-phenylenediamine, N,N'-di-β-naphthyl-p-phenylenediamine; mixtures of diarylamines; modified bis-diarylamines such as N-cyclohexyl-N'-phenyl-p-phenylenediamine; alkylated diarylamines such as monooctyl- and dioctyldiphenylamine; mixtures including alkylated diarylamines; ketone-diarolamine condensation products such as diphenylamine acetone condensation products; dihydroquinolines such as 1,2-dihydro-2,2,4-trimethyl-6-phenylquinoline; mixtures of dihydroquinolines and diarylamines; aldehyde amine condensation products such as aldol-α-naphthylamine condensation products and butyraldehyde-aniline condensation products; alkyl arylamines such as N,N'-diphenylethylenediamine; and aldehyde imines such as N,N-disalicylalethylenediamine. It is believed that mixtures of the foregoing compounds can function effectively in the implementation of the instant invention.

Of particular utility in the practice of the instant invention are the so-called aromatic amine antioxidants. That is, amine antioxidants containing a significant aromatic character. Of particular utility in the practice of the invention are N,N'-substituted-p-phenylenediamines having the structure:

wherein $R^3$ and $R^4$ are selected from a group consisting of alkyl radicals having three to twelve carbon atoms, aryl radicals having from six to twelve carbon atoms and aryl radicals having seven to twelve carbon atoms; diphenylamines having a structure:

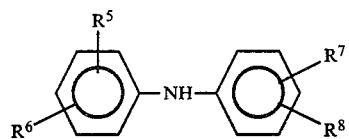

wherein $R^5$, $R^6$, $R^7$, and $R^8$ are selected from a group consisting of hydrogen, alkyl radicals having one to twenty carbon atoms; aryl radicals having seven to twelve carbon atoms and mixtures thereof; and aminoaryltetrahydroquinolines having a structure as follows:

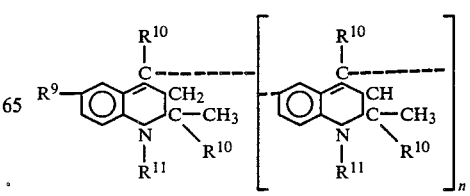

-continued

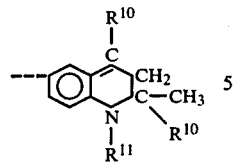

wherein n is equal to 1-8, $R^9$ is alkylphenylcyclohexylalkoxy, or phenoxy; $R^{10}$ is a lower alkyl group such as methyl, ethyl, propyl, isopropyl, butyl, and amine; and $R^{11}$ is hydrogen or a nitroso radical. Typically in the aminoaryltetrahydroquinolines, $R^9$ and $R^{10}$ are the same or different lower alkyl groups.

Contact between the antioxidant and the polypyrrole is continued until a quantity of antioxidants has become incorporated into the polypyrrole to provide a desired degree of enhanced flexibility to the polypyrrole structure. Typically, the antioxidant is contacted with a polypyrrole by solvating the antioxidant and contacting the resulting solution with the polypyrrole structure. Suitable solvents for solvating the antioxidants would include organic liquids capable of supporting at least 0.5% by weight of the antioxidant in solution. Desirably, such solvents include a capability for swelling but not dissolving the polypyrrole. Typical such solvents would include toluene, benzene, and xylene.

Contact between the antioxidant and the polypyrrole structure can be accomplished employing suitable or conventional techniques such as by immersion in a solvent bath containing the antioxidant or by suitable or conventional spray and/or roller application techniques.

The use of a solvent carrying the antioxidant is preferred in the practice of the invention because, it is believed, the solvent assists in introducing the antioxidant into interior portions of the polypyrrole structure.

EXAMPLE I

A solution of 300 ml. propylene carbonate, 10.2 grams $Bu_4NHSO_4$ (Bu=Butyl) and 9.6 ml. distilled pyrrole were placed in an electrolytic cell having a Nesa glass anode (tin oxide on glass, available from PPG Industries) and a palladium cathode having a 5% by weight nickle surface. Current was applied at 6 Volts for 216 minutes to produce a poly-pyrrole film on the anode. Current density at the anode surface was approximately 3 milliamperes/$cm^2$. The resulting film was stripped by peeling and rinsed in acetonitrile.

EXAMPLE II

Films made in accordance with Example I were soaked for approximately seventy-two hours in a 0.5% by weight solution in toluene of the following antioxidants:

(1) Goodrite ® DPPD, diphenylphenylenediamine, available from B. F. Goodrich;
(2) Flectol ®H, having a formula:

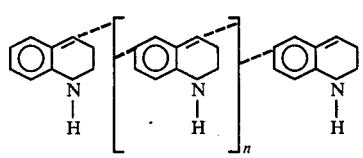

wherein n=1-8 and including up to 1% (weight) paraffinic oil, available from Monsanto;
(3) Antozite ® 67, having a formula:

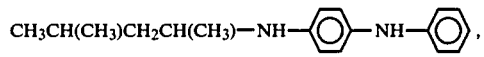

available from B. F. Goodrich;
(4) Stalite ® S, having a formula:

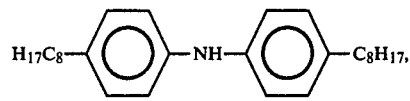

available from B. F. Goodrich.
A control was run by immersion in toluene without the inclusion of any antioxidant. And a control was run without immersion in any material whatsoever.

EXAMPLE III

The polypyrrole films formed in Example I and treated in Example II were subjected to weight loss determinations as a function of temperature. The results are displayed in Table I wherein odd number samples were contacted with nitrogen and even numbered samples contacted with air during weight loss determinations. Percentages are weight percentages.

TABLE I

| Sample # | Weight % Loss (∓0.5%) at Temperature | | | | | |
|---|---|---|---|---|---|---|
| | 120° C. | 200° C. | 250° C. | 300° C. | 400° C. | 500° C. |
| Control (No Antioxidant) | | | | | | |
| 1 | 4.5 | 13 | 24 | 32 | 38 | 41.5 |
| 2 | 5.0 | 12 | 21 | 29 | 39 | 45 |
| 3 | 4.0 | 14 | 24 | 31 | 39 | 42.5 |
| 4 | 4.5 | 13 | 22 | 30 | 39 | 44 |
| Goodrite DPPD | | | | | | |
| 5 | 4.0 | 13.5 | 23 | 31.5 | 39 | 42 |
| 6 | 4.5 | 13.5 | 22 | 29.5 | 39 | 43 |
| 7 | 3.5 | 13.5 | 23.5 | 31.5 | 39 | 42 |
| 8 | 5.0 | 13 | 22 | 29.5 | 38.5 | 44 |
| Stalite S | | | | | | |
| 9 | 4.0 | 13.5 | 24 | 31.5 | 39 | 42 |
| 10 | 4.0 | 12 | 21 | 29 | 38.5 | 44 |
| 11 | 4.0 | 14 | 24 | 32 | 39 | 42 |
| 12 | 5.0 | 13 | 22 | 29.5 | 39 | 43 |
| Flectol H | | | | | | |
| 13 | 3.5 | 10 | 18.5 | 27 | 36.5 | 40.5 |
| 14 | 3.0 | 11 | 18 | 25 | 34.5 | 40 |
| 15 | 3.0 | 10.5 | 19 | 26.5 | 36 | 39.5 |
| 16 | 3.5 | 10 | 17 | 25 | 34.5 | 40 |
| Antozite 67 | | | | | | |
| 17 | 3 | 11 | 19 | 29 | 38 | 41.5 |
| 18 | 3.5 | 11 | 18 | 26 | 35.5 | 40.5 |
| 19 | 3.5 | 11.5 | 20 | 31 | 39 | 42.5 |
| 20 | 3.0 | 11 | 18 | 26 | 35.5 | 40.5 |
| Toluene Control | | | | | | |
| 21 | 4.5 | 14.5 | 24.5 | 32.5 | 40 | 43 |
| 22 | 5.0 | 14 | 22 | 30 | 40 | 44 |
| 23 | 4.0 | 14 | 24 | 32 | 39.5 | 43 |
| 24 | 5.0 | 14 | 22 | 30 | 40 | 44 |

EXAMPLE IV

Films made in Example I and treated with antioxidants in Example II were subjected to physical performance testing (flexibility). Untreated films were excessively brittle and did not survive being placed in an Instron device for testing elongation properties. Control films soaked in toluene demonstrated 1.6% elongation to break and 1.5% elongation to yield with 0.016 megajoules/m$^3$ work to yield. Films soaked in Flectol H-DS demonstrated 3.6% elongation to break, 3.6% elongation to yield, and 0.54 megajoules/m$^3$ work to yield. Films soaked in Antozite 67, Stalite S, and Goodrich DPPD also demonstrated substantial increases in elongation and work to yield properties over the control.

The less brittle polypyrroles of the instant invention find utility in the protection of surfaces from corrosion and chemical attack, and in particular in providing electrically conductive coatings that may provide chemical and corrosion resistance. Compositions resulting from the practice of the method of the invention include the antioxidant within the polypyrrole structure and the antioxidant functions to enhance flexibility and to diminish brittleness in, particularly, films of polypyrroles treated in accordance with the invention.

The quantity of antioxidant comprising a solution used to apply antioxioant to the polypyrrole structures can range in concentration from as little as a tenth of a percent by weight antioxidant to the limitation of saturating the carrier solvent with the antioxidant. Preferably, the solution contains between about 0.1% and about 5% antioxidant. The final compositions of polypyrroles including the antioxidants generally reflect an equilibrium quantity of antioxidant within the polypyrrole with respect to the solution in which the polypyrrole structure has been soaked.

While a preferred embodiment of the invention has been shown and described in detail, it should be apparent that various modifications and alterations may be made thereto without departing from the spirit and scope of the claims that follow.

What is claimed is:

1. A method for enhancing the flexibility of structures formed of a polypyrrole comprising the steps of: forming the polypyrrole structure; contacting the structure with an amine antioxidant for a period of time sufficient to render the structure less brittle; and desisting contact with the antioxidant.

2. The method of claim 1, the structure being contacted with a solution of the antioxidant.

3. A method for enhancing the flexibility of a film formed of a polypyrrole comprising the steps of: forming the film employing an electrolytic polymerization technique; contacting the formed film with an amine antioxidant for a period of time sufficient to render the film less brittle; and desisting contact with the antioxidant.

4. The method of claim 3, the formed film being contacted with a solution of the antioxidant.

* * * * *